United States Patent [19]

Scott

[11] Patent Number: 4,583,790
[45] Date of Patent: Apr. 22, 1986

[54] EMPTY/LOAD BRAKE CONTROL SYSTEM
[75] Inventor: Daniel G. Scott, Swissvale, Pa.
[73] Assignee: American Standard Inc., Wilmerding, Pa.
[21] Appl. No.: 682,625
[22] Filed: Dec. 17, 1984
[51] Int. Cl.⁴ .............................................. B60T 8/20
[52] U.S. Cl. .................................................. 303/23 R
[58] Field of Search ........... 188/195; 303/22 A, 22 R, 303/23 A, 23 R, 84 R

[56] References Cited
U.S. PATENT DOCUMENTS 3,671,086  6/1972  Scott .................................. 303/23 R
4,417,767 11/1983  Billeter .............................. 303/23 R

OTHER PUBLICATIONS

Westinghouse Air Brake Instruction Pamphlet AB—7 5/8–12, *Automatic Empty and Load Freight Car Brake Equipment*, No. 5062-5, Dec. 1963.

*Primary Examiner*—Duane A. Reger
*Attorney, Agent, or Firm*—G. J. Falce

[57] ABSTRACT

An empty/load brake control system for a railway freight car comprising a pair of load sensors and a proportional valve to proportion the brake cylinder delivery pressure when an "empty" load condition of the car is sensed. The load sensor valves are piped in series to control the proportioning valve so that both load sensors must detect an "empty" load condition to pilot the proportional valve. In this sense, a false load reading toward an "empty" load condition due to car rocking is prevented from occurring, by mounting the respective load sensors directly opposite each other on different sides of the railway car.

7 Claims, 2 Drawing Figures

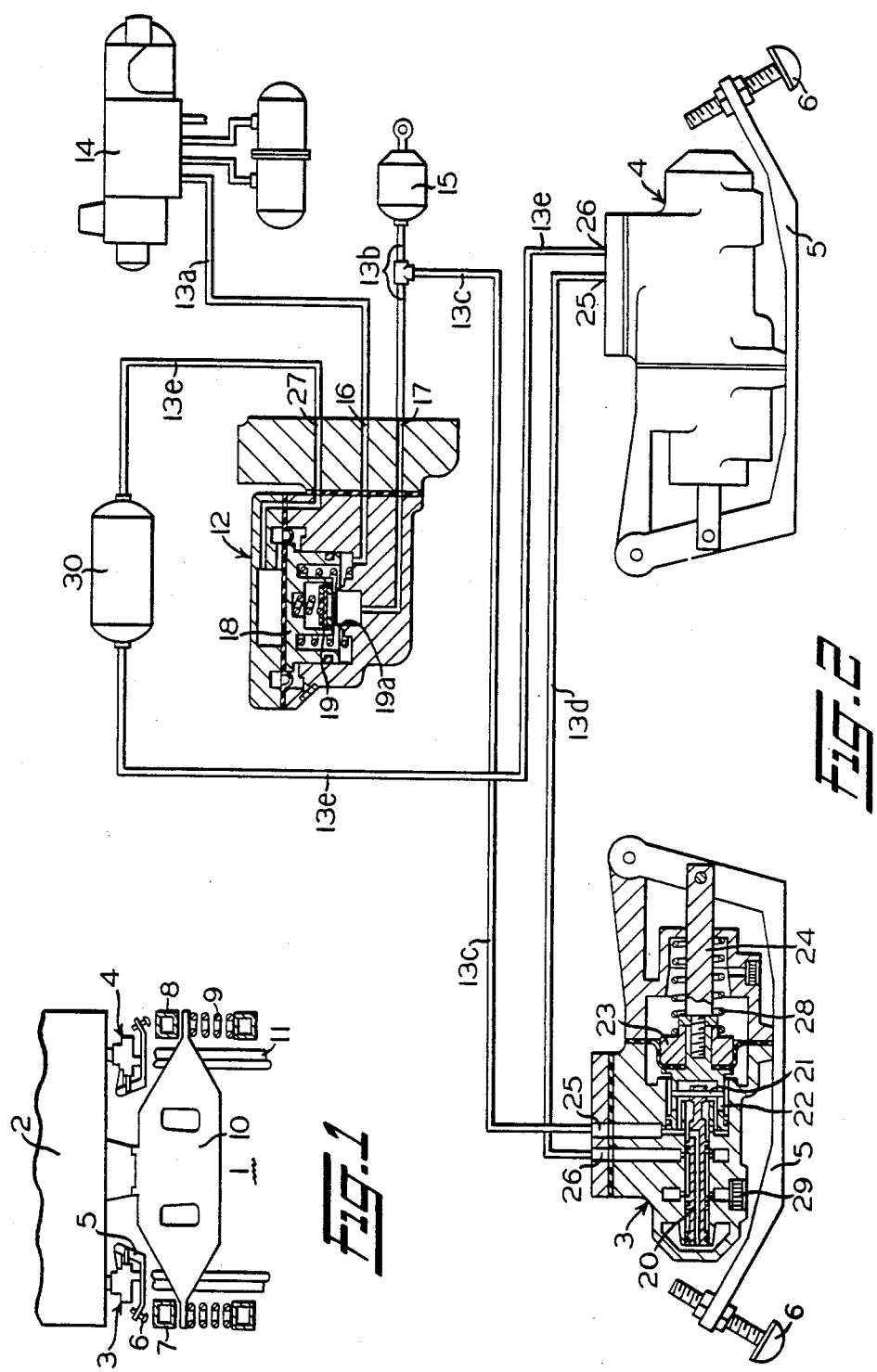

EMPTY/LOAD BRAKE CONTROL SYSTEM

BACKGROUND OF THE INVENTION

The present invention is related to fluid-pressure-operated, empty/load brake control apparatus for a railway freight car, and particularly for a railway freight car having short travel springs on which the car is supported.

Since the car springs become compressed with increasing loads, the degree of spring deflection serves as an indication of the car load condition, i.e., whether the car is in a "full" or "empty" load condition. Generally, a sensing arm or the like is arranged between the sprung and unsprung portions of the car, as a means of detecting the degree of spring deflection and thus the car load condition.

Generally, older vintage freight cars employ short travel type springs and are equipped with the old standard AB-7 ⅝-12 Automatic Empty and Load Freight Brake Equipment, as described in WABCO Instruction Pamphlet No. 5062-5. Briefly, this equipment is characterized by a strut cylinder that is mounted on the end of the bolster (sprung portion) and includes a strut piston having a foot which is aligned to engage a stop on the truck side frame (unsprung portion). The piston is actuated by a cut-off valve to detect the degree of spring deflection in order to set a changeover valve to the appropriate load setting only during periods when the car brake pipe is being recharged, as when the car is picked up from a siding where it had been set out for loading or unloading. In this manner, the empty/load condition of the freight car is determined by operation of the strut cylinder for each load change and the strut cylinder is thereafter cut out in order to isolate the effect of car rock and roll during over-the-road service and thus prevents the consequent variation in the degree of spring deflection from influencing the load setting. Because of the complexity of this equipment, it is relatively costly and expensive to maintain.

Presently, there is an effort underway to upgrade these older vintage cars with the newer standard SC-1 Empty/Load Brake Equipment shown in U.S. Pat. No. 3,671,086 and issued June 20, 1972 to the assignee of the present invention. This equipment is characterized by a proportional valve via which fluid under pressure is connected from the car control valve device to the brake cylinder and a single load sensor valve that detects the car load condition according to the deflection of the car springs. In the "full" load condition, the fluid pressure developed by the car control valve is delivered directly through the proportional valve to the car brake cylinder, but in the "empty" load condition, the load sensor valve connects the brake cylinder delivery pressure to the proportional valve to cause the proportional valve to reduce the fluid pressure delivered to the brake cylinder by a predetermined percentage.

The single load sensor valve is mounted at one side of the car body (sprung portion) above the truck side frame (unsprung portion) and includes a sensor arm that is actuated during the time a brake application is in effect to sense the relationship of the car body to the side frame, as an indication of spring deflection and thus the car load condition. It will be appreciated, therefore, that contrary to the aforementioned AB-7 ⅝-12 empty/load equipment used on older vintage cars, the SC-1 empty/load equipment is continuously effective during a brake application and is thus simpler in construction and accordingly less costly in both initial cost and to maintain. In order to prevent car rock or roll from affecting the load setting of this continuous acting type sensor valve, a simple lost-motion arrangement is provided between the sensor arm and valving to prevent a false changeover or transition between the "full" and "empty" load settings due to car rock and roll.

In attempting to adapt this less costly SC-1 empty/load equipment on cars having short travel springs, however, it is probable that due to the effect of car rock and roll combined with the normal car bolster side bearing clearance, sensor arm movement may exceed the available lost-motion, and could result in a false sensor reading of the car load condition. It will be appreciated that such false sensor readings result in undesirable brake pressures, due to cycling of the sensor valve between the "full" and "empty" load settings. In the case of a loaded car, this cycling of the load sensor valve is undesirable from the standpoint that reduced braking results when the load sensor valve cycles to the "empty" load setting. Such reduced braking, of course, can result in longer stopping distances.

SUMMARY OF THE INVENTION

It is, therefore, the object of this invention to negate the effect of car rock and roll on the load setting of SC-1 type empty/load equipment, when used on cars having short travel springs, particularly with respect to underbraking of the car.

Briefly, this objective is accomplished by utilizing two load sensor valves in series to pilot a proportional valve via which the delivery pressure from an AB/D type control valve device or the like is connected to the brake cylinder of a railway car having short travel springs on which the car is supported. The sensor valves are mounted on the opposite sides of the railway car such that, the sensor arm of each sensor valve is aligned vertically above a respective side frame of the railway car truck. This requires both sensor valves to be in an open condition concurrently, in order to communicate control fluid pressure to the proportional valve, as a positive indication of the car load condition being detected as "empty". As in conventional SC-1 empty/load equipment, the proportional valve is operative in response to this control pressure to reduce the fluid pressure delivered to the brake cylinder. In the event one or the other of the load sensor valves is alternately open, as would occur during car rock and roll, for example, the closed one of the series connected sensor valves is effective to interrupt the connection of control pressure to the proportional valve. In the absence of control pressure, the proportional valve is thus effective to connect the full brake cylinder delivery pressure developed by the control valve device to the car brake cylinder. Accordingly, any false load reading toward an "empty" load condition due to car rock and roll is eliminated, thereby preventing an undesired reduction in the level of braking. In this respect, the integrity of the empty/load equipment is preserved when using a continuous acting load sensor such as that used with the SC-1 empty and load brake equipment on freight cars supported by short travel springs.

BRIEF DESCRIPTION OF THE DRAWINGS

Other objects and advantages of the invention will become apparent from the following more detailed explanation when taken with the accompanying drawings in which:

FIG. 1 is an outline view of a railway car equipped with a pair of load sensor valves, each mounted to the underside of the car body on opposite sides thereof for sensing the car load condition in accordance with the distance between the car body and the truck side frames; and FIG. 2 is a schematic arrangement of the present invention incorporating the oppositely-mounted load sensor valves in series with a proportioning valve, which controls fluid pressure delivered to the car brake cylinder in accordance with the car load condition.

DESCRIPTION AND OPERATION

Referring to FIG. 1 of the drawings, there is shown a railway freight car 1 having a body 2 to which is suitably mounted, at the underside thereof, a load sensor valve 3 on one side of the car body and another load sensor valve 4 on the side of body 2 opposite load sensor valve 3. Each sensor valve 3, 4 includes a sensor arm 5 pivotally connected to the sensor body at one end and having an adjustable foot 6 at the free end. The load sensors are mounted so that foot 6 is aligned vertically above the respective left and right side frame members 7, 8, so as to be engageable therewith upon actuation of the load sensor valves. Housed in each side frame member, in a conventional manner, is a spring or nest of springs 9 on which a bolster 10 is supported. The car body is in turn carried by the bolster and in this respect may be referred to as a sprung member. Conversely, the side frame members 7, 8, which carry springs 9, may be referred to as the unsprung members, since the side frame members are in turn carried by the car wheels 11.

As discussed in greater detail hereinafter, sensor arm 5 of the respective sensor valves 3, 4 is actuated by brake cylinder pressure when a brake application is made, provided the brake cylinder pressure exceeds a predetermined value. Foot 6 of each sensor valve arm 5 is thus engageable with the top of the respective side frame members 7, 8 in order to detect the relative distance between the sprung car body 1 and the unsprung side frame members, as a measure of the car load condition.

The empty/load brake control system shown in FIG. 2 incorporates load sensor valves 3 and 4 with a proportional valve 12, in the brake cylinder delivery line 13a and 13b between a freight car control valve device 14, such as a conventional AB/D type control valve, and a conventional brake cylinder device 15. Load sensor valves 3 and 4, as well as proportional valve 12, are fully described in U.S. Pat. No. 3,671,086, in which the empty/load system employs but a single load sensor valve mounted on one side of a freight car whose load condition is to be detected for the purpose of adjusting brake pressure according to whether the car is loaded or empty.

Proportional valve 12 has an inlet 16 connected to delivery line segment 13a and an outlet 17 connected to delivery line segment 13b, which is in turn connected to brake cylinder device 15. A differential area piston 18 operates a cut-off valve 19 which cooperates with a valve seat 19a to control fluid pressure communication between inlet 16 and outlet 17. In the open position of cut-off valve 19, full pressure developed by control valve device 14 is passed to brake cylinder 15 via delivery line segments 13a and 13b.

Load sensor valves 3 and 4 include a spool valve member 20 having a cross pin 21, the ends of which project into an elongated slot 22 of an actuating piston 23 to constitute a lost-motion connection therebetween. Actuating piston 23 includes a push rod 24 to which sensor arm 5 is connected to effect movement of spool valve member 20. An inlet 25 of load sensor valve 3 is connected to a branch line 13c of delivery line segment 13b. An outlet 26 of load sensor valve 3 is connected to inlet 25 of load sensor valve 4 via a line 13d, and the outlet 26 of load sensor valve 4 is connected to a control port 27 of proportional valve 12 via a line 13e. A return spring 28 acts on piston 23 of load sensor valves 3 and 4 to maintain piston spool valve 20 in a position to connect inlet ports 25 to the side of piston 21 opposite the side on which return spring 28 acts, and to concurrently connect the respective outlets 26 to an atmospheric vent 29. Also connected in line 13e is an equalizing volume 30.

When a brake application is made, control valve device 14 operates in a well-known manner to develope brake cylinder pressure in delivery line 13a, which pressure is effective under differential piston 18 to maintain piston 18 in its upward-most position, as shown. In this position of piston 18, cut-off valve 19 is held off its seat 19a and the brake cylinder pressure is connected directly to brake cylinder device 15 via delivery line segment 13b. Concurrently, this brake cylinder delivery pressure effective in line 13b is connected via branch line 13c to inlet 25 of load sensor valve 3 and thence to the face of piston member 23 to actuate the piston and cause sensor arm 5 to be rotated about its pivot point on the sensor valve body until foot 6 engages side frame 7.

Assuming car 1 is loaded, car body 2 (sprung portion) will be deflected downwardly relative to side frame 7 (unsprung member), so as to cause foot 6 of sensor valve 3 to engage the respective side frame 7 upon movement of sensor arm 5 only sufficiently to shift spool valve member 20 rightwardly to a position in which outlet 26 is cut off from atmospheric vent 29 and also from inlet 25. Line 13c is thus cut off from line 13d leading to sensor valve 4, and also from line 13e leading to control port 27 of proportional valve 12. Inlet 27 of proportional valve 12 thus remains depressurized, and full brake cylinder pressure is delivered from control valve 14 to brake cylinder 15 via the open check valve 19.

In the event car body 2 should rock about its connection with bolster 10 such that, the left-hand side of car 1 having sensor valve 3 rises, the brake cylinder pressure effective at inlet 25 and piston 21 of load sensor valve 3 will force foot 6 of sensor arm 5 to maintain engagement with side frame 7, thus increasing the deflection of sensor arm 5. Because the side bearing clearance with short travel springs constitutes a larger percentage of the empty/load range of spring deflection than with conventional springs, the allowable lost-motion in the pin connection between the piston 23 and spool valve 20 may not be sufficient to compensate for the car rocking. That is, sensor arm 5 may be deflected sufficiently to cause piston 23 to shift spool valve 20 rightwardly to a position in which inlet 25 is connected to outlet 26. The effective brake cylinder pressure is thus connected from line 13c to line 13d and to input 25 of load sensor valve 4 to actuate piston 23 and sensor arm 5 thereof. Since the left-hand side of car body 2 is assumed to rise due to rocking of the car, the right-hand side of body 2 having sensor valve 4 tends to drop or at least remain stable, so that load sensor valve 4 continues to sense a loaded car condition. Inlet 25 of sensor valve 4 thus remains cut off from its outlet port 26, so that line 13e and thus control port 27 of proportional valve 12 continue to remain depressurized and full brake cylinder pressure developed by control valve device 14 continues to flow to brake cylinder 15 via the open check valve 19 of proportional valve 12.

When the car body 2 rocks in the opposite direction, load sensor valve 4 will read an "empty" load condition, but load sensor valve 3 will return to a "full" load condition reading. Sensor valve 3 is thus effective to interrupt fluid pressure communication between its inlet 25 and outlet 26 to thereby prevent pressurization of line 13e and control port 27 of proportional valve 12 and accordingly maintain full delivery of brake cylinder pressure to brake cylinder device 15.

From the foregoing, it will be seen that so long as either one of load sensor valves 3 or 4 senses a "full" load condition, as would be assumed to occur as a result of the present invention during rocking of the car body 2, pressure will be cut off from the proportional valve control port to prevent any reduction in brake cylinder pressure from taking place. Thus, the danger of "empty" car brake pressures on a "full" load car resulting from a false reading toward an "empty" load condition due to car rocking, and thus longer stopping distances than desired, is avoided by this arrangement constituting the present invention.

When a car is in an "empty" load condition, both load sensor valves 3 and 4 will respond concurrently to the fact that car body 2 is raised relative to the side frame members, so that the respective sensor arms will shift both spool valves 20 to their rightward-most position in which inputs 25 are connected to outlets 26 at each sensor valve.

When a brake application is made, the brake cylinder pressure routed via open check valve 19 of proportional valve 12 is connected to control port 27 of proportional valve 12 via line 13c, sensor valve 3, line 13d, sensor valve 4, and line 13e in parallel with line 13b leading to brake cylinder 15. Consequently, differential piston 18 of proportional valve 12 is effective to close check valve 19 when the effective brake cylinder pressure above piston 18 reaches a predetermined percentage of the delivery pressure developed by control valve device 14 and effective under piston 18.

Should rocking of the car body 2 occur while the car is in an "empty" load condition, one or the other of the load sensor valves will read a "full" load condition, while the other senses an "empty" load condition. As heretofore explained, this results in the sensor valve that reads "full" cutting off pressure from control port 27 of proportional valve 12. While this will affect the "empty" car braking to such extent that "load" condition braking pressure results, such false sensing toward load braking can be tolerated, as this will only tend to shorten the train stopping distance and not lengthen the stopping distance.

Having now described the invention, what I claim as new and desire to secure by Letters Patent, is:

1. An empty/load brake control system for a railway vehicle having sprung and unsprung members comprising:
   (a) a fluid pressure actuated brake cylinder device;
   (b) a brake cylinder pressure control valve device;
   (c) proportional valve means between said control valve device and said brake cylinder device for relaying brake cylinder delivery pressure from said control valve device to said brake cylinder device;
   (d) sensor means for detecting the vehicle load condition, so as to connect the relayed brake cylinder delivery pressure to said proportional valve in parallel with said brake cylinder device in a first load condition of said vehicle and to interrupt said connection of said relayed brake cylinder delivery pressure to said proportional valve in a second load condition of said vehicle;
   (e) said proportional valve means being operative in response to the relayed brake cylinder delivery pressure connected thereto in said first load condition for establishing a lower brake cylinder pressure than in said second load condition; and
   (f) said sensor means comprising first and second load sensor valves connected in series such that, said relayed brake cylinder delivery pressure is connected to said proportional valve only when said first load condition is sensed concurrently by both said first and second load sensor valves.

2. An empty/load brake control system, as recited in claim 1, wherein each of said first and second sensor valves is mounted to a respective one of said sprung and unsprung members and is further provided with a sensing arm movably engageable with the other of said sprung and unsprung members in response to said brake cylinder delivery pressure to establish said first and second load condition according to the relative position of said sprung and unsprung members.

3. An empty/load brake control system, as recited in claim 2, wherein said first and second sensor valves are mounted on said one of said sprung and unsprung members on opposite sides of the axis of said railway vehicle.

4. An empty/load brake control system, as recited in claim 3, wherein said first and second load sensor valves are mounted on said one of said sprung and unsprung members on the opposing sides of said vehicle axis directly opposite from each other.

5. An empty/load brake control system, as recited in claim 4, further characterized in that:
   (a) said proportional valve includes an inlet connected to said control valve device, an outlet connected to said brake cylinder device, and a control port; and
   (b) each of said sensor valves further includes an inlet and an outlet, said inlet of said first sensor valve being connected between said outlet of said proportional valve and said brake cylinder device, the outlet of said first sensor valve being connected to the inlet of said second sensor valve, and the outlet of said second sensor valve being connected to said control port of said proportional valve.

6. An empty/load brake control system, as recited in claim 5, wherein said first and second sensor valves establish a fluid pressure communication between said inlet and said outlet thereof in said first load condition and interrupt said fluid pressure communication between said inlet and said outlet thereof in said second load condition.

7. An empty/load brake control system, as recited in claim 6, wherein said first load condition is an empty load condition and said second load condition is a full load condition.

* * * * *